(12) United States Patent
Burlingame et al.

(10) Patent No.: US 10,675,740 B2
(45) Date of Patent: Jun. 9, 2020

(54) FASTENING DEVICES AND METHODS OF UTILIZING THE SAME

(71) Applicant: Columbia River Staple & Lumber Wrap, Inc., Sherwood, OR (US)

(72) Inventors: Waylon Bleu Burlingame, Tigard, OR (US); Mark Stanley Burlingame, Sherwood, OR (US)

(73) Assignee: Columbia River Staple & Lumber Wrap, Inc., Sherwood, OR (US)

( * ) Notice: Subject to any disclaimer, the term of this patent is extended or adjusted under 35 U.S.C. 154(b) by 324 days.

(21) Appl. No.: 15/621,760

(22) Filed: Jun. 13, 2017

(65) Prior Publication Data

US 2018/0354113 A1    Dec. 13, 2018

(51) Int. Cl.
| | |
|---|---|
| B25C 5/16 | (2006.01) |
| B65D 85/62 | (2006.01) |
| F16B 15/00 | (2006.01) |
| F16B 15/08 | (2006.01) |
| B25C 1/00 | (2006.01) |
| F16B 15/02 | (2006.01) |

(52) U.S. Cl.
CPC ............ *B25C 5/1693* (2013.01); *B25C 1/005* (2013.01); *B65D 85/62* (2013.01); *F16B 15/0015* (2013.01); *F16B 15/02* (2013.01); *F16B 15/08* (2013.01)

(58) Field of Classification Search
CPC ....... B25C 5/1693; B25C 5/06; B25C 1/1001; B25C 5/00; B25C 1/005; B65D 85/62
USPC .............................................. 227/120, 18, 8
See application file for complete search history.

(56) References Cited

U.S. PATENT DOCUMENTS

| | | | |
|---|---|---|---|
| 239,111 | A | 3/1881 | O'Meara |
| 853,005 | A | 5/1907 | Dawkins |
| 2,366,510 | A | 1/1945 | Frank |
| 3,385,498 | A | 5/1968 | Downie |

(Continued)

FOREIGN PATENT DOCUMENTS

DE    102007050012    4/2009

OTHER PUBLICATIONS

Machine-generated English translation of the abstract of DE 102007050012, downloaded from Espacenet.com on Oct. 5, 2016.

*Primary Examiner* — Hemant Desai
*Assistant Examiner* — Jacob A Smith
(74) *Attorney, Agent, or Firm* — Dascenzo Intellectual Property Law, P.C.

(57) ABSTRACT

Fastening devices and methods of utilizing the same. The fastening devices include a handle, a trigger mechanism, a fastener magazine, a fastening head, and a tab feed structure. The tab feed structure includes a tab magazine, a feed rail, and a tab advance mechanism. The tab magazine is configured to contain an accordion-folded stack of tabs, which is defined by a first subset of a plurality of interconnected tabs. The fasting device is configured to, upon actuation of the trigger mechanism, urge a fastener through a leading tab of the plurality of interconnected tabs and into a workpiece to operatively affix the leading tab to the workpiece and also to advance a tab strip, which is defined by a second subset of the plurality of interconnected tabs, toward a fastening region with the tab advance mechanism. The methods include methods of utilizing and/or loading the fastening device.

22 Claims, 7 Drawing Sheets

(56) References Cited

U.S. PATENT DOCUMENTS

| | | | |
|---|---|---|---|
| 3,799,086 A * | 3/1974 | Block | D05B 33/00 112/470.18 |
| 4,801,062 A * | 1/1989 | Austin | B25C 5/1696 227/120 |
| 4,903,880 A * | 2/1990 | Austin | B25C 5/1696 227/120 |
| 5,195,672 A | 3/1993 | Souverain | |
| 5,209,756 A * | 5/1993 | Seedhom | A61B 17/0642 606/151 |
| 5,259,826 A * | 11/1993 | Woods | B25C 5/1693 156/DIG. 22 |
| 5,292,048 A | 3/1994 | Vanderwiel | |
| 5,925,214 A | 7/1999 | Klein et al. | |
| 5,934,504 A * | 8/1999 | Elliott | B25C 1/006 221/232 |
| 5,947,362 A | 9/1999 | Omli | |
| 6,109,474 A | 8/2000 | Haugen | |
| 6,145,725 A | 11/2000 | Omli | |
| 6,478,209 B1 * | 11/2002 | Bruins | B25C 5/1693 227/136 |
| 6,550,660 B1 * | 4/2003 | Chlebowski | B25C 5/11 227/131 |
| 6,779,700 B2 | 8/2004 | Bruins et al. | |
| 6,834,731 B2 * | 12/2004 | Burlingame | B25C 5/1693 173/138 |
| 6,837,412 B2 | 1/2005 | Lamb | |
| 6,968,945 B2 | 11/2005 | Bruins et al. | |
| 7,090,109 B2 * | 8/2006 | Burlingame | B25C 5/1693 221/232 |
| 7,090,455 B2 | 8/2006 | Lamb | |
| 7,093,714 B2 | 8/2006 | Huang | |
| 7,207,095 B2 | 4/2007 | Bruins et al. | |
| 7,232,050 B2 * | 6/2007 | Omli | A41H 37/04 227/15 |
| 7,344,058 B2 | 3/2008 | Bruins et al. | |
| 7,481,346 B2 * | 1/2009 | Vanden Berg | B25C 5/06 227/147 |
| 7,506,789 B2 * | 3/2009 | Shor | B25C 5/1693 227/147 |
| 7,628,305 B2 | 12/2009 | Vanden Berg et al. | |
| 7,699,201 B2 * | 4/2010 | Hagan | B25C 1/003 227/120 |
| 7,699,202 B2 | 4/2010 | Shor | |
| 7,963,428 B2 | 6/2011 | Searle et al. | |
| 8,251,273 B2 | 8/2012 | Shor | |
| 8,485,410 B1 | 7/2013 | Harshman | |
| 9,254,131 B2 * | 2/2016 | Soltz | A61B 17/0644 |
| 9,915,282 B2 | 3/2018 | Lamb | |
| 10,358,825 B2 | 7/2019 | Omli et al. | |
| 2001/0030138 A1 * | 10/2001 | Bruins | B25C 1/006 206/343 |
| 2003/0057248 A1 * | 3/2003 | Bruins | B25C 5/1693 227/18 |
| 2003/0197046 A1 * | 10/2003 | Steed | B25C 5/06 227/2 |
| 2004/0118732 A1 | 6/2004 | Lee | |
| 2004/0251264 A1 | 12/2004 | Brinkmann | |
| 2005/0065009 A1 * | 3/2005 | Lu | B31D 5/0047 493/350 |
| 2005/0155221 A1 * | 7/2005 | Fulbright | B21J 15/043 29/812.5 |
| 2006/0251497 A1 | 11/2006 | Lamb | |
| 2007/0295779 A1 * | 12/2007 | Fulbright | B21J 15/043 227/138 |
| 2008/0164278 A1 * | 7/2008 | Myerscough | B25C 5/00 221/69 |
| 2009/0050664 A1 | 2/2009 | Henza | |
| 2011/0083396 A1 | 4/2011 | Shelton et al. | |
| 2015/0322995 A1 | 11/2015 | Omli | |
| 2018/0202483 A1 | 7/2018 | Lamb | |
| 2019/0316358 A1 | 10/2019 | Omli et al. | |

* cited by examiner

FASTENING DEVICES AND METHODS OF UTILIZING THE SAME

FIELD OF THE DISCLOSURE

The present disclosure relates to fastening devices and to methods of utilizing the fastening devices.

BACKGROUND OF THE DISCLOSURE

Powered fastening tools, such as pneumatic staplers, may be utilized to secure lumber wrap to lumber. The lumber wrap may be wrapped around lumber and fastened to the lumber, such as with staples or other fasteners, to protect the lumber from environmental or other damage during storage and transport. Tabs may be utilized to reinforce the fasteners, thereby resisting tear-through and retaining the lumber wrap attached to the lumber.

Historically, these tabs were applied manually. Specifically, an operator would hold the tab and utilize a general-purpose staple gun to staple the tabs to the lumber. More recently, special-purpose staple guns have been developed. These special-purpose staple guns may be configured to automatically feed both tabs and staples, and they generally feed one tab and one staple each time that the trigger is pulled.

While these special-purpose staple guns may provide certain advantages over manual tab application methods, they may be bulky and can be tiresome to utilize. Additionally or alternatively, ergonomics of these special-purpose staple guns may be insufficient to provide a desired level of operator comfort. Furthermore, the tabs may be stored in coils, which are bulky to handle and generally results in wasting of a significant number of caps. Thus, there exists a need for improved fastening devices and/or for improved methods of operating fastening devices.

SUMMARY OF THE DISCLOSURE

Fastening devices and methods of utilizing the same. The fastening devices include a handle, a trigger mechanism, a fastener magazine, a fastening head, and a tab feed structure. The handle is configured to be gripped by a user of the fastening device. The trigger mechanism is configured to be actuated by the user. The fastener magazine is configured to contain a plurality of fasteners. The fastening head defines a fastening region.

The tab feed structure includes a tab magazine, a feed rail, and a tab advance mechanism. The tab magazine is configured to contain an accordion-folded stack of tabs, which is defined by a first subset of a plurality of interconnected tabs. The feed rail is configured to receive a tab strip, which is defined by a second subset of the plurality of interconnected tabs, from the tab magazine. The feed rail also is configured to direct the tab strip from the tab magazine toward the fastening region. The tab advance mechanism is configured to selectively advance the tab strip toward the fastening region.

The fastening device is configured to, upon actuation of the trigger mechanism, urge a fastener through a leading tab of the plurality of interconnected tabs and into a workpiece to operatively affix the leading tab to the workpiece. The fastening device also is configured to, upon actuation of the trigger mechanism, advance the tab strip toward the fastening region with the tab advance mechanism.

In some embodiments, the methods include methods of utilizing the fastening device to operatively affix a leading tab of a plurality of interconnected tabs to a workpiece with a fastener. These methods include positioning, with a tab feed structure of the fastening device, the leading tab within a fastening region of the fastening device. The positioning includes extending a second subset of the plurality of interconnected tabs, which defines a tab strip, from a tab magazine, through a feed rail, and to the fastening region. During the positioning, a first subset of the plurality of interconnected tabs defines an accordion-folded stack of tabs that is positioned within the tab magazine. These methods also include engaging the fastening region with the workpiece and urging, with a fastening head of the fastening device, a fastener from a fastener magazine, through the leading tab, and into the workpiece.

In some embodiments, the methods include methods of loading the fastening device with a plurality of interconnected tabs arranged in an accordion-folded stack of tabs. These methods include positioning the accordion-folded stack of tabs within a tab magazine of the fastening device. These methods also include unfolding a second subset of the plurality of interconnected tabs from the accordion-folded stack of tabs to define a tab strip. Subsequent to the unfolding, the accordion-folded stack of tabs is defined by a first subset of the plurality of interconnected tabs. These methods further include extending the tab strip through a tab magazine opening of the tab magazine, through a feed rail of the fastening device, and to a fastening region of the fastening device.

DETAILED DESCRIPTION AND BEST MODE OF THE DISCLOSURE

FIGS. 1-11 provide examples of fastening devices 10 and/or of methods 300 and/or 400, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 1:
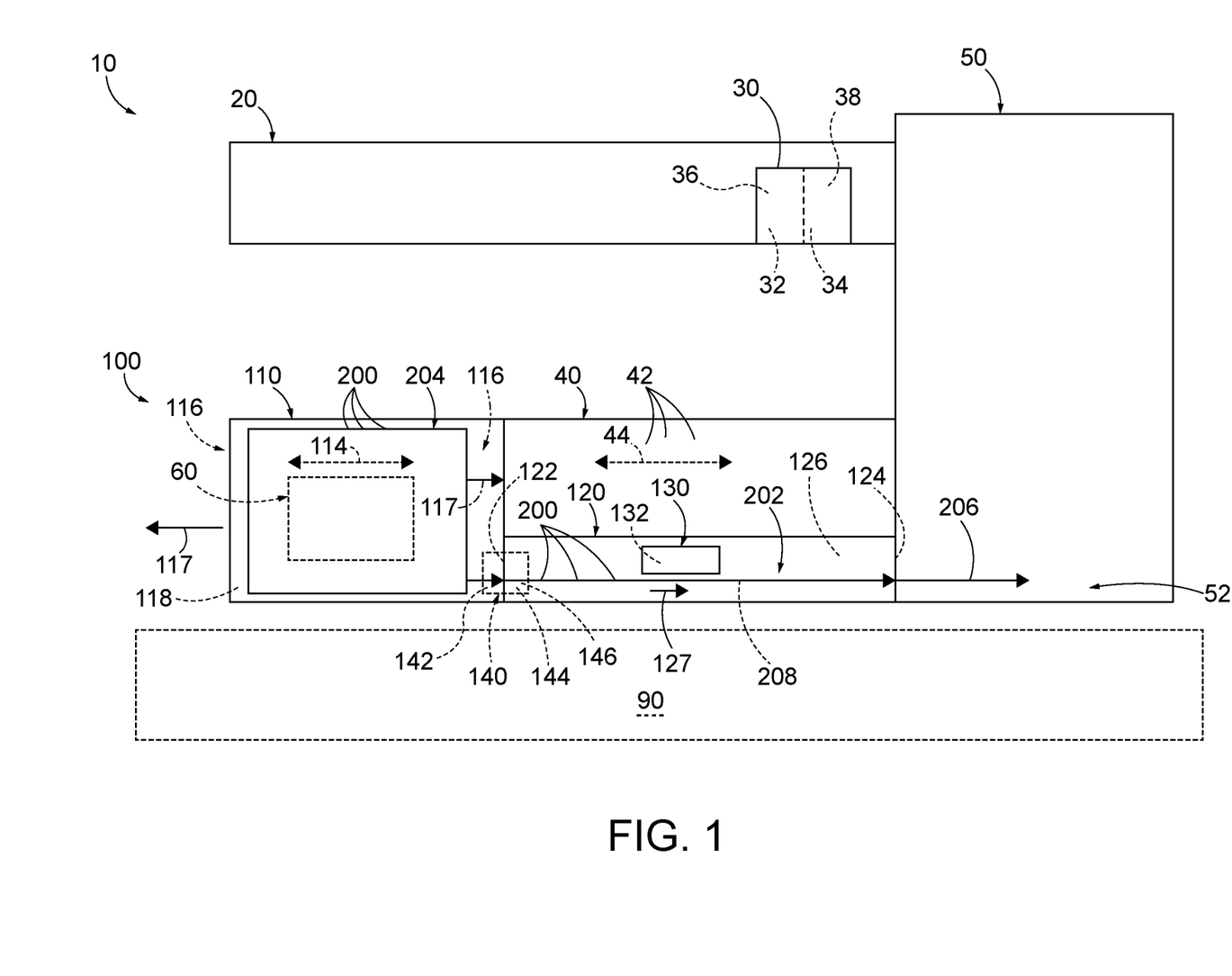
FIG. 1 is a schematic representation of examples of a fastening device according to the present disclosure.
Figure 2:
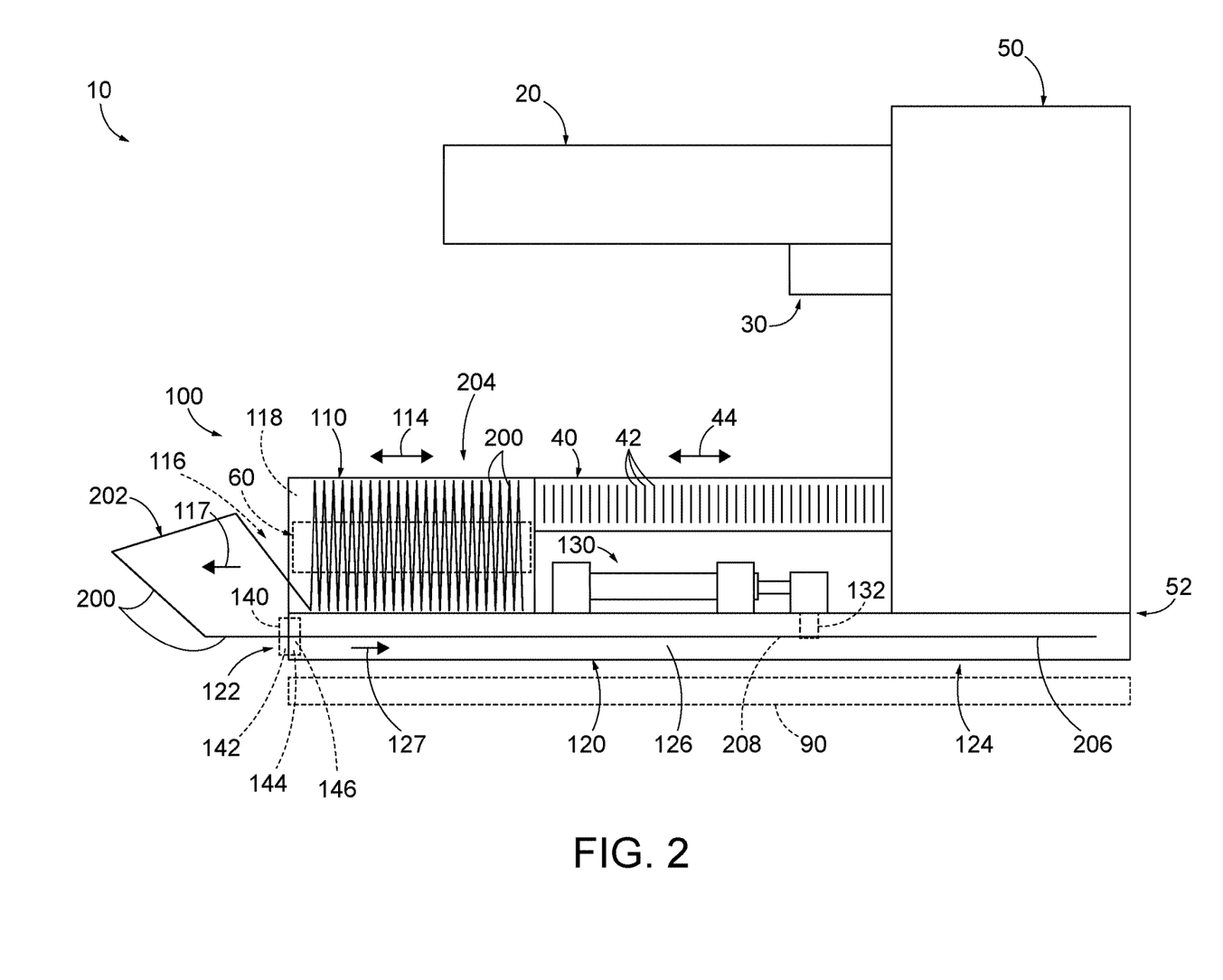
FIG. 2 is a less schematic representation of examples of a fastening device according to the present disclosure.
Figure 3:
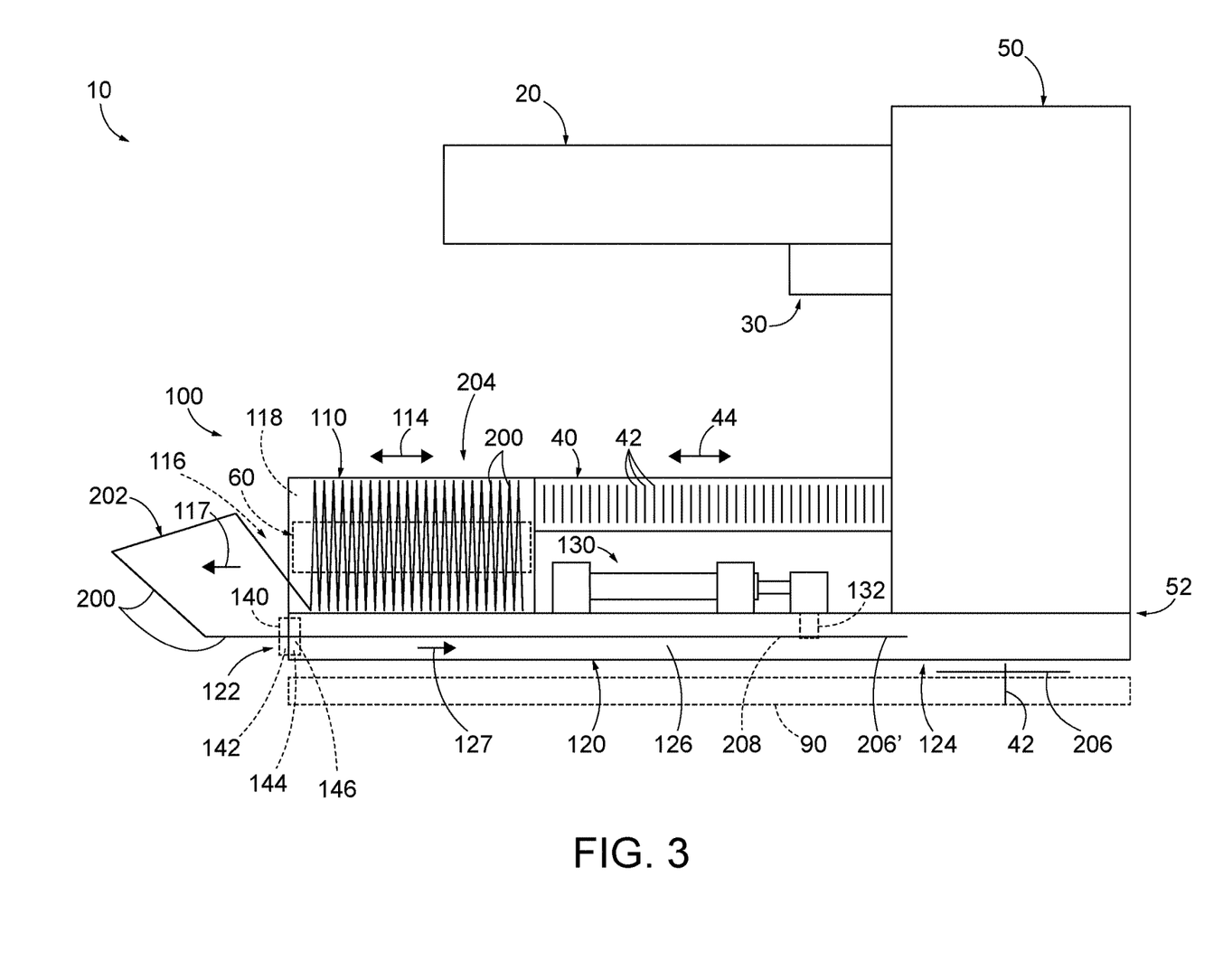
FIG. 3 illustrates the fastening device of FIG. 2 fastening a tab to a workpiece with a fastener.
Figure 4:
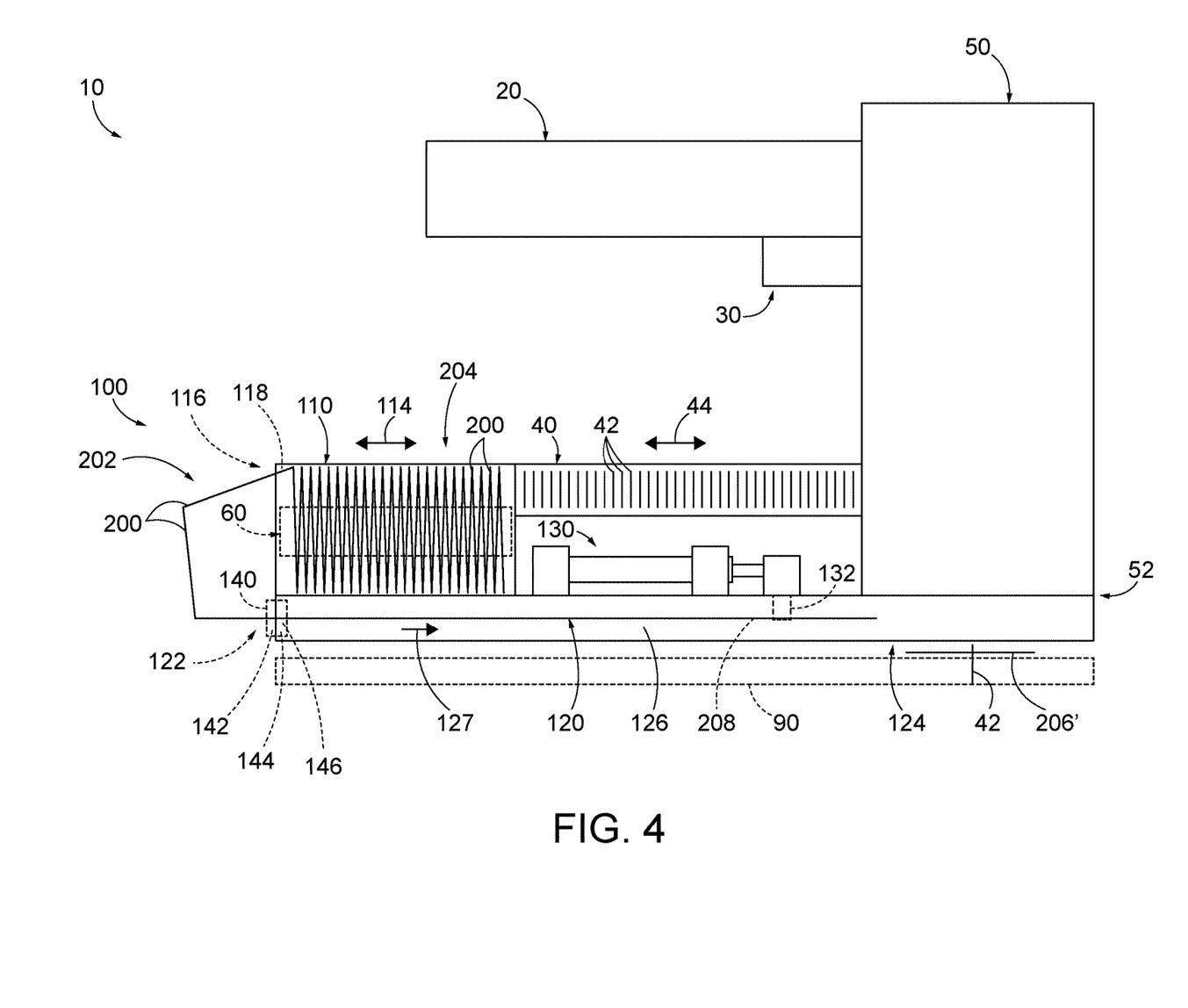
FIG. 4 illustrates the fastening device of FIGS. 2-3 advancing a tab strip within a feed rail.

FIG. 1 is a schematic representation of examples of a fastening device 10 according to the present disclosure, while FIGS. 2-4 are less schematic representations of examples of a fastening device 10 according to the present disclosure. Examples of fastening device 10 include any suitable pneumatic, electric, and/or cordless stapler, nailer, and/or other fastening device.

As illustrated in FIGS. 1-4, fastening devices 10 include a handle 20, which is configured to be gripped by a user, and a trigger mechanism 30, which is configured to be actuated by the user. Fastening devices 10 also include a fastener magazine 40, which is configured to contain and/or house a plurality of fasteners 42, and a fastening head 50 that defines a fastening region 52.

As further illustrated in FIGS. 1-4, fastening devices 10 include a tab feed structure 100. Tab feed structure 100 includes a tab magazine 110, which is configured to contain an accordion-folded stack of tabs 204 that is formed from a first subset, portion, and/or fraction of a plurality of interconnected tabs 200. Tab feed structure 100 also includes a feed rail 120, which also may be referred to herein as a tab feed rail 120 and/or as a tab strip feed rail 120. Feed rail 120 is configured to receive a tab strip 202 from tab magazine 110 and to direct the tab strip from the tab magazine toward and/or into fastening region 52. Tab strip 202 is formed from a second subset, portion, and/or fraction of the plurality of interconnected tabs 200, with tab strip 202 remaining interconnected with the accordion-folded stack of tabs. Tab feed structure 100 further includes a tab advance mechanism 130, which is configured to selectively advance tab strip 202 toward and/or into fastening region 52.

A leading tab 206 in the plurality of interconnected tabs 200 may extend from feed rail 120 and/or may extend between a workpiece 90 and fastening region 52, as illustrated in FIG. 2. During operation of fastening device 10, a user may grip and/or hold fastening device 10 via handle 20 and may actuate trigger mechanism 30, such as with a user's finger. Upon, or responsive to, actuation of trigger mechanism 30, fastening devices 10 may utilize fastening head 50 to urge a fastener 42, within fastening region 52, through leading tab 206, and into workpiece 90, thereby operatively affixing leading tab 206 to workpiece 90. This is illustrated schematically in FIG. 3. The actuation of trigger mechanism 30 also may separate leading tab 206 from the plurality of interconnected tabs 200 and/or from tab strip 202, thereby defining a new, or subsequent, leading tab 206', as also illustrated in FIG. 3. Subsequently, tab advance mechanism 130 may advance tab strip 202 toward fastening region 52, thereby positioning new leading tab 206' between workpiece 90 and fastening region 52, as illustrated in FIG. 4. This process may be repeated any suitable number of times to operatively affix any suitable number of leading tabs 206/206' to workpiece 90, or to another workpiece 90, with corresponding fasteners 42.

Tab feed structure 100 may include any suitable structure that may be adapted, configured, designed, and/or constructed to retain accordion-folded stack of tabs 204, to permit tab strip 202 to extend therefrom, to direct tab strip 202 from tab magazine 110 to fastening region 52, and/or to selectively advance the tab strip toward the fastening region. As an example, tab feed structure 100 may be configured to operatively retain accordion-folded stack of tabs 204 within tab magazine 110 and also to selectively urge tab strip 202 from the tab magazine responsive to actuation of trigger mechanism 30 and/or responsive to actuation of tab advance mechanism 130.

As discussed, tab strip 202 and accordion-folded stack of tabs 204 may be defined by separate regions, portions, and/or subsets of the plurality of interconnected tabs 200. Stated another way, the first subset of the plurality of interconnected tabs may be accordion-folded to form and/or define accordion-folded stack of tabs 204. In addition, the second subset of the plurality of interconnected tabs may extend from accordion-folded stack of tabs 204 as tab strip 202. As such, advancement of tab strip 202 toward fastening region 52 may decrease a number of interconnected tabs within accordion-folded stack of tabs 204 (i.e., may decrease a number of interconnected tabs in the first subset of the plurality of interconnected tabs).

Tab magazine 110 may include any suitable structure that may be adapted, configured, sized, designed, and/or constructed to contain, house, and/or at least partially enclose accordion-folded stack of tabs 204. Additionally or alternatively, tab magazine 110 may include any suitable structure that may be adapted, configured, sized, designed, and/or constructed to permit tab strip 202 to extend therefrom while maintaining operative attachment between tab strip 202 and accordion-folded stack of tabs 204.

As an example, tab magazine 110 may have and/or define a tab magazine opening 116 and a tab-receiving volume 118. Tab magazine opening 116 may open into, or permit access to, tab-receiving volume 118. In addition, tab magazine opening 116 may be sized and/or shaped to permit insertion of accordion-folded stack of tabs 204 into tab-receiving volume 118 and/or to permit tab strip 202 to extend from, or exit, the tab-receiving volume. Tab-receiving volume 118 may be sized and/or shaped to receive accordion-folded stack of tabs 204 and/or to retain the accordion-folded stack of tabs therein.

Tab magazine opening 116 may face in an opening direction 117. In addition, feed rail 120 may be configured to direct tab strip 202 in a feed rail direction 127. It is within the scope of the present disclosure that opening direction 117 and feed rail direction 127 may have any suitable relative orientation therebetween. As an example, and as illustrated in solid lines in FIGS. 1-3, feed rail direction 127 may be different from, may be opposed to, and/or may face away from opening direction 117. Such a configuration may permit tab magazine 110 and fastener magazine 40 to extend at least partially parallel to one another, as illustrated in FIGS. 2-4, thereby decreasing an overall size of fastening device 10 and/or making the fastening device more compact. However, this is not required of all fastening devices 10, and it is within scope of the present disclosure that opening direction 117 and feed rail direction 127 may be the same direction, as indicated by dash-dot lines for opening direction 117 in FIG. 1. Additionally or alternatively, feed rail direction 127 and opening direction 117 may define a skew angle, an obtuse angle, and/or an acute angle relative to one another.

It is within the scope of the present disclosure that, as illustrated in FIGS. 1-4, tab magazine 110 may be spaced-apart, separate, and/or distinct from fastener magazine 40. Stated another way, fastening device 10 may be configured to contain spaced-apart, separate, and/or distinct supplies of fasteners 42 and interconnected tabs 200. Stated yet another way, a given fastener 42 only may be in contact with and/or extend through a corresponding leading tab 206/206' subsequent to actuation of trigger mechanism 30 and/or of fastening head 50.

It also is within the scope of the present disclosure that tab magazine 110 and fastener magazine 40 may extend parallel, or at least substantially parallel, to one another. As an example, tab magazine 110 may define a tab magazine longitudinal axis 114, and fastener magazine 40 may define a fastener magazine longitudinal axis 44 that may be parallel, or at least substantially parallel, to the tab magazine longitudinal axis.

As illustrated in dashed lines in FIGS. 1-4, fastening device 10 may include a retention structure 60. Retention structure 60, when present, may be adapted, configured, designed, and/or constructed to retain, or operatively retain, accordion-folded stack of tabs 204 in and/or within tab magazine 110 and/or in and/or within tab-receiving volume 118 thereof. In addition, retention structure 60 also may be adapted, configured, designed, and/or constructed to permit tab strip 202 to extend from tab magazine 110 and/or to permit a portion of accordion-folded stack of tabs 204 to transition into and/or to become tab strip 202 responsive to actuation of tab advance mechanism 130.

Retention structure 60, when present, may operatively retain accordion-folded stack of tabs 204 within tab magazine 110 in any suitable manner. As examples, retention structure 60 may be configured to form a frictional interface with the accordion-folded stack of tabs, to form an interference fit with the accordion-folded stack of tabs, and/or to mechanically engage the accordion-folded stack of tabs.

As another example, retention structure 60 may be configured to apply a retention force to accordion-folded stack of tabs 204. In addition, tab advance mechanism 130 may be configured to apply a tab advance force to tab strip 202. The tab advance force may be greater than the retention force. Stated another way, the retention force may be sufficient to retain accordion-folded stack of tabs 204 within tab magazine 110 prior to application of the tab advance force. However, the retention force may be insufficient to prevent motion and/or other advancement of tab strip 202 from tab magazine 110 when the tab advance mechanism applies the tab advance force to the tab strip.

Figure 5:
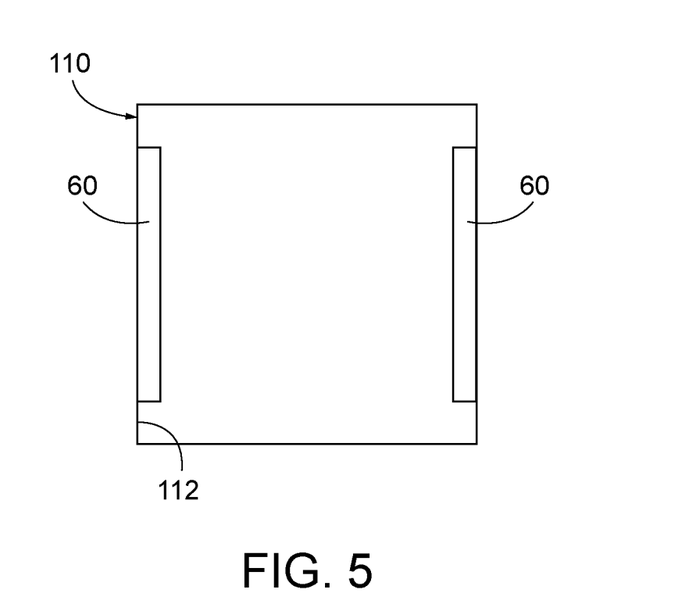
FIG. 5 is a schematic end view of an example of a tab magazine according to the present disclosure.
Figure 6:
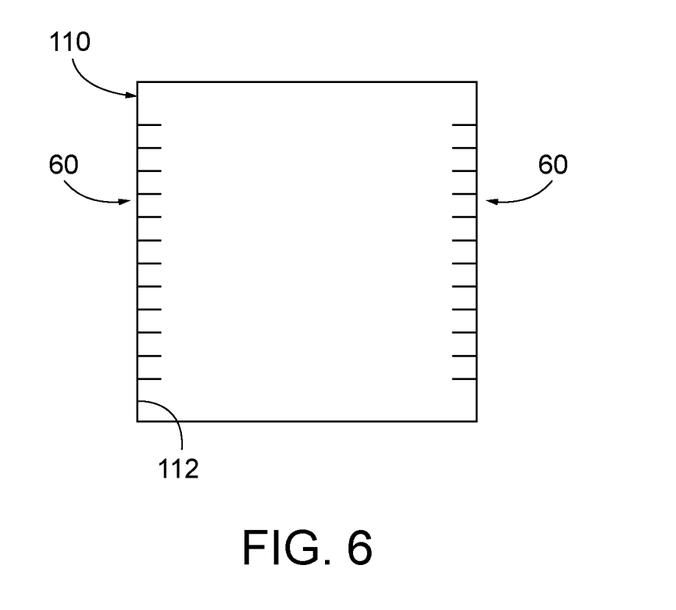
FIG. 6 is a schematic end view of another example of a tab magazine according to the present disclosure.

Examples of retention structure 60 include a fabric that is configured to mechanically and/or frictionally engage with the accordion-folded stack of tabs, a projection that is configured to mechanically and/or frictionally engage the accordion-folded stack of tabs, a rib that is configured to mechanically and/or frictionally engage the accordion-folded stack of tabs, a plurality of hooks and/or loops of a hook-and-loop fastener, and/or a plurality of fibers that is configured to mechanically and/or frictionally engage the accordion-folded stack of tabs. Examples of retention structures 60 are illustrated in FIGS. 5-6, which are schematic end views of tab magazines according to the present disclosure. As illustrated in FIGS. 5-6, tab magazine 110 may define an internal surface 112, and retention structures 60 may project from internal surface 112. This may include uniform, or at least substantially uniform, projecting regions, as illustrated in FIG. 5, or discrete projecting regions, as illustrated in FIG. 6. However, this is not required of all embodiments, and it is within the scope of the present disclosure that retention structure 60 may be defined by, or may define, internal surface 112.

Feed rail 120 may include any suitable structure that may be adapted, configured, sized, designed, and/or constructed to receive tab strip 202 from tab magazine 110 and/or to direct tab strip 202 toward and/or into fastening region 52. As an example, and as illustrated schematically in FIGS. 1-4, feed rail 120 may include a feed channel 126 that is sized to receive and retain tab strip 202.

Figure 7:
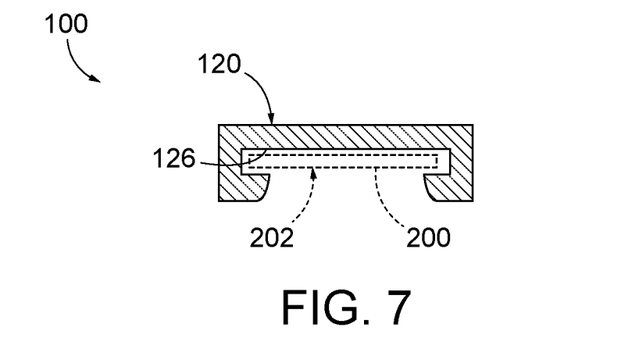
FIG. 7 is a schematic cross-sectional view of a feed rail according to the present disclosure.
Figure 8:
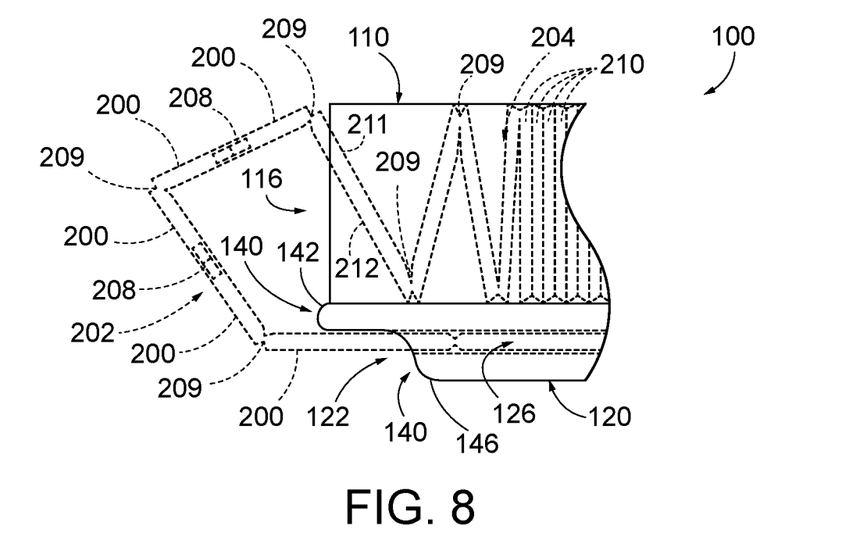
FIG. 8 is a schematic representation of a side view of a portion of a feed rail and a tab magazine according to the present disclosure.
Figure 9:
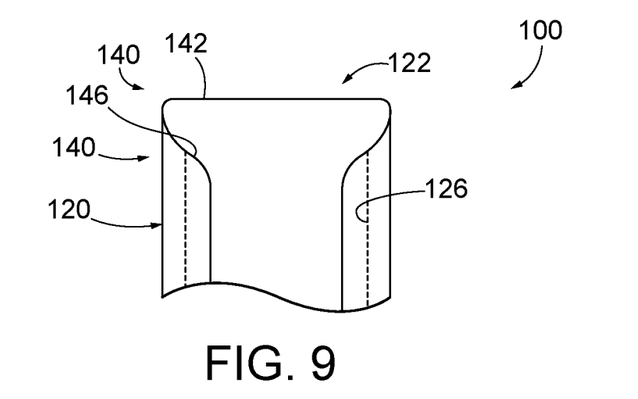
FIG. 9 is a schematic representation of a bottom view of a portion of a feed rail including a feed channel, according to the present disclosure.

Feed rails 120 including feed channels 126 also are illustrated in FIGS. 7-9. FIG. 7 is a less schematic cross-sectional view of a feed rail 120, according to the present disclosure, including a feed channel 126, while FIG. 8 is a less schematic representation of a side view of a portion of a feed rail 120, including a feed channel 126, and a tab magazine 110, according to the present disclosure. FIG. 9 is a schematic representation of a bottom view of a portion of a feed rail 120 including a feed channel 126.

As illustrated in FIGS. 1-4 and 8-9, feed rails 120 may define a strip inlet 122, which is configured to receive tab strip 202. In addition, and as illustrated in FIGS. 1-4, feed rails 120 also may define a strip outlet 124 that is proximal fastening region 52 relative to strip inlet 122 and/or that is configured to convey tab strip 202 into fastening region 52. It is within the scope of the present disclosure that strip inlet 122 may face away from, may face in a same direction as, and/or may face toward tab magazine opening 116 of tab magazine 110. Additionally or alternatively, feed rail 120 may extend at least partially between tab magazine opening 116 and fastening region 52.

Feed rail 120 may be formed in any suitable manner. As examples, feed rail 120 may include one or more of a unitary feed rail, an extruded feed rail, and/or a machined feed rail.

As illustrated in FIGS. 2-4 and 8, tab strip 202 may extend at least partially external to fastening device 10 as the tab strip extends between tab magazine 110 and feed rail 120. Additionally or alternatively, and as also illustrated in FIGS. 2-4 and 8, tab strip 202 may reverse direction as the tab strip extends from the tab magazine to the feed rail. This reverse in direction may facilitate the parallel, or stacked, arrangement of tab magazine 110 and feed rail 120 that is illustrated in FIGS. 2-4 and 8, thereby decreasing an overall size of fastening device 10.

To facilitate entry of tab strip 202 into feed rail 120 and/or into feed channel 126 of the feed rail, fastening device 10 may include one or more transition structures 140. Transition structures 140, when present, may be configured to direct tab strip 202 from tab magazine opening 116 and to and/or into strip inlet 122 of feed rail 120. Examples of transition structures 140 include a rounded edge 142, a roller 144, and/or a dovetail region 146, as illustrated in at least FIGS. 1-4.

It is within the scope of the present disclosure that transition structures 140, when present, may be formed and/or defined by feed rail 120. As an example, transition structures 140 may be specially formed and/or shaped region(s) of feed rail 120. However, this is not required of all fastening devices 10, and it is within the scope of the present disclosure that transition structures 140 may be separate and/or distinct from feed rail 120 and/or may be operatively attached to any suitable portion and/or region of fastening device 10, including feed rail 120.

Tab advance mechanism 130 may include any suitable structure that may be adapted, configured, designed, sized, and/or constructed to selectively advance tab strip 202 toward and/or into fastening region 52. This may include selectively advancing the tab strip responsive to actuation, by the user, of trigger mechanism 30. Examples of tab advance mechanism 130 include a linear actuator and/or a pneumatic cylinder.

As a more specific example, and as illustrated in FIGS. 1-4, tab advance mechanism 130 may include an engagement structure 132 that may be configured to operatively engage with a corresponding indexing structure 208 of tab strip 202. This operative engagement may permit tab advance mechanism 130 to advance and/or move tab strip 202 via motion of engagement structure 132 and is illustrated by the transition from FIG. 3 to FIG. 4.

It is within the scope of the present disclosure that, for a given actuation of trigger mechanism 30, fastening device 10 may be configured to advance tab strip 202 and urge fastener 52 through leading tab 206/206' in any suitable order. As an example, and upon actuation of trigger mechanism 30, fastening device 10 may selectively advance the tab strip prior to the fastener being urged through the leading tab by the fastening head. Alternatively, fastening device 10 may selectively advance the tab strip subsequent to the fastener being urged through the leading tab by the fastening head.

It is within the scope of the present disclosure that tab advance mechanism 130 may selectively advance any suitable number, or a selected number, of tabs 200 for a given actuation of trigger mechanism 30. Examples of the selected number of tabs include 1, 2, 3, 4, 5, at least 1, at least 2, at least 3, at least 4, at least 5, and/or more than 5 tabs.

Handle 20 may include any suitable structure that may be adapted, configured, sized, and/or shaped to be gripped and/or held by the user. Handle 20 may be operatively attached, may extend from, and/or be formed by any suitable portion of fastening device 10, such as fastening head 50, fastener magazine 40, and/or tab feed structure 100. Handle 20 additionally or alternatively may support, be operatively attached to, and/or may be sized, shaped, and/or configured to permit convenient access for the user to trigger mechanism 30.

Trigger mechanism 30 may include any suitable structure that may be adapted, configured, designed, and/or constructed to be actuated by the user, to initiate actuation of fastening head 50, and/or to initiate actuation of tab feed structure 100 and/or of tab advance mechanism 130 thereof. As an example, and as illustrated in FIG. 1, trigger mechanism 30 may include a fastening operational linkage 32 that may operably link the trigger mechanism with fastening head 50 and/or that may permit the user to control the operation of fastening head 50 via actuation of trigger mechanism 30. Examples of fastening operational linkage 32 include a mechanical fastening operational linkage, a pneumatic fastening operational linkage, and/or an electric fastening operational linkage.

As another example, and as also illustrated in FIG. 1, trigger mechanism 30 may include a tab feed operational linkage 34 that may operably link the trigger mechanism with tab feed structure 100 and/or that may permit the user to control the operation of tab feed structure 100 via actuation of trigger mechanism 30. Examples of tab feed operational linkage 34 include a mechanical tab feed operational linkage, a pneumatic tab feed operational linkage, and/or an electric tab feed operational linkage.

It is within the scope of the present disclosure that trigger mechanism 30 may include and/or a be a single trigger mechanism, such as a single trigger, a single button, and/or a single switch that, upon actuation thereof, causes fastening device 10 to both urge the fastener through the leading tab and advance the tab strip. However, this is not required of all fastening devices 10. As an example, fastening device 10 may include a first trigger mechanism 36 and a second trigger mechanism 38 that is separate and/or distinct from the first trigger mechanism and/or that is configured to be actuated independently from the first trigger mechanism. Under these conditions, actuation of first trigger mechanism 36 may cause fastening device 10 to urge the fastener through the leading tab and actuation of second trigger mechanism 38 may cause the fastening device to advance the tab strip toward the fastening region.

Such a configuration may permit independent operation of fastening head 50 and tab advance mechanism 130, thereby providing the user with additional operational flexibility. As an example, the user might utilize the first trigger mechanism without first actuating the second trigger mechanism. Under these conditions, fastening device 10 operates as a conventional fastening device and drives fasteners into the workpiece without necessarily operatively affixing a tab to the workpiece. As another example, the user might utilize the second trigger mechanism to advance a selected number of tabs prior to operatively affixing the selected number of tabs to the workpiece via actuation of the first trigger mechanism.

Fastener magazine 40 may include any suitable structure that may be adapted, configured, designed, sized, and/or constructed to contain the plurality of fasteners 42 and/or to supply fasteners 42 to fastening region 52. As an example, the fastener magazine may include a fastener volume configured to receive, house, and/or retain the plurality of fasteners. The plurality of fasteners may be arranged in a fastener stack in which each fastener is operatively affixed to at least one adjacent fastener, such as utilizing a film and/or an adhesive. Examples of fasteners 42 include any suitable nail, brad, and/or staple.

Fastening head 50 may include any suitable structure that may be adapted, configured, designed, sized, and/or constructed to define fastening region 52 and/or to urge the fastener through the leading tab and into the workpiece. Examples of fastening head 50 include an electrically actuated fastening head and a pneumatically actuated fastening head. An additional example of fastening head 50 includes a driving anvil that is configured to urge and/or drive the selected fastener into the workpiece. It is within the scope of the present disclosure that, upon actuation of trigger mechanism 30, fastening head 50 additionally may be configured to urge the fastener from the fastener magazine, such as to permit and/or facilitate the fastener being urged into the workpiece.

Examples of conventional fastening devices, of general-purpose staple guns, and/or of special-purpose staple guns are disclosed in U.S. Pat. Nos. 8,485,410, 7,963,428, 6,837,412, 6,834,731, 6,550,660, and 5,925,214. Additional examples of conventional fastening devices, of general-purpose staple guns, and/or of special-purpose staple guns are disclosed in U.S. Patent Application Publication Nos. 2008/0164278, 2004/0251264, and 2003/0197046. The complete disclosures of these patents and patent application publications are hereby incorporated by reference.

The plurality of interconnected tabs 200 may include any suitable structure that may include a plurality of distinct but interconnected tabs, that may define accordion-folded stack of tabs 204, that may define tab strip 202, and/or that may define indexing structure 208. As discussed, the first subset of the plurality of interconnected tabs may be arranged in the accordion-folded stack of tabs and may be positioned within tab magazine 110. In addition, and as also discussed, the second subset of the plurality of interconnected tabs may extend from the tab magazine, as the tab strip, may extend through feed rail 120, and/or may extend to and/or into fastening region 52. Stated another way, a single, or continuous, length of interconnected tabs 200 may define both tab strip 202 and accordion-folded stack of tabs 204.

It is within the scope of the present disclosure that accordion-folded stack of tabs 204 may include and/or may be defined by a plurality of tab layers. As examples, the accordion-folded stack of tabs may include at least 5, at least 10, at least 15, at least 20, at least 25, at least 30, at least 40, at least 50, at least 60, at least 70, at least 80, at least 90, and/or at least 100 tab layers. As discussed herein, and during operation of fastening device 10, interconnected tabs 200 within accordion-folded stack of tabs 204 may transition to tab strip 202. As such, a number of tab layers within accordion-folded stack of tabs 204 may vary during operation of the fastening device.

Each tab layer may include any suitable number of tabs. As examples, each tab layer may include 1, 2, 3, 4, 5, at least 1, at least 2, at least 3, at least 4, at least 5, at most 10, at most 8, at most 6, at most 4, and/or at most 2 tabs, or interconnected tabs.

Each tab in the plurality of interconnected tabs may be separated from at least one adjacent tab in the plurality of interconnected tabs by a perforation 209, as illustrated in FIG. 8. Perforation 209 also may be referred to herein as, or may be, a web, a thin region, a weakened region, a reduced cross-sectional area region, and/or a tapered region. In general, and as illustrated in FIG. 8, a cross-sectional area of a region of the tab strip that defines perforations 209 may be less than a cross-sectional area of a region of the tab strip that does not define the perforation.

As discussed, and as illustrated in FIGS. 1-4 and 8, the plurality of interconnected tabs 200 may have and/or define a plurality of indexing structures 208. Each indexing structure 208 may be associated with, or defined by, a given, or a corresponding one, of the plurality of interconnected tabs. Alternatively, each indexing structure 208 may be associated with, or defined by, two adjacent tabs in the plurality of interconnected tabs.

The plurality of interconnected tabs 200 may have and/or define any suitable shape. As an example, each tab in the plurality of interconnected tabs may be planar, or at least substantially planar.

Turning more specifically to FIG. 8, a less schematic example of plurality of interconnected tabs 200 is illustrated in dashed lines. As illustrated and discussed herein, the plurality of interconnected tabs is a continuous strip of interconnected tabs that defines both a tab strip 202 and an accordion-folded stack of tabs 204, with the accordion-folded stack of tabs being defined by a first subset of the plurality of interconnected tabs and the tab strip being defined by a second subset of the plurality of interconnected tabs. FIG. 8 illustrates each layer within the accordion-folded stack of tabs as including a single interconnected tab 200. However, and as discussed herein, each layer may include any suitable number of interconnected tabs.

As illustrated in FIG. 8, the plurality of interconnected tabs may define a first face, or side, 211 and a second face, or side, 212. When the first subset of the plurality of interconnected tabs is arranged within the accordion-folded stack of tabs, a given layer 210 within the accordion-folded stack of tabs may have a first adjacent layer positioned on one side thereof and a second adjacent layer positioned on a second, opposed, side thereof. Under these conditions, a first face of the given layer may face toward, abut, and/or contact, a first face of the first adjacent layer. Similarly, a second face of the given layer may face toward, abut, and/or contact, a second face of the second adjacent layer. Stated another way, accordion-folded stack of tabs 204 may be arranged such that alternating pairs of first face 211 and second face 212 face toward, abut, and/or contact, one another therein.

Figure 10:
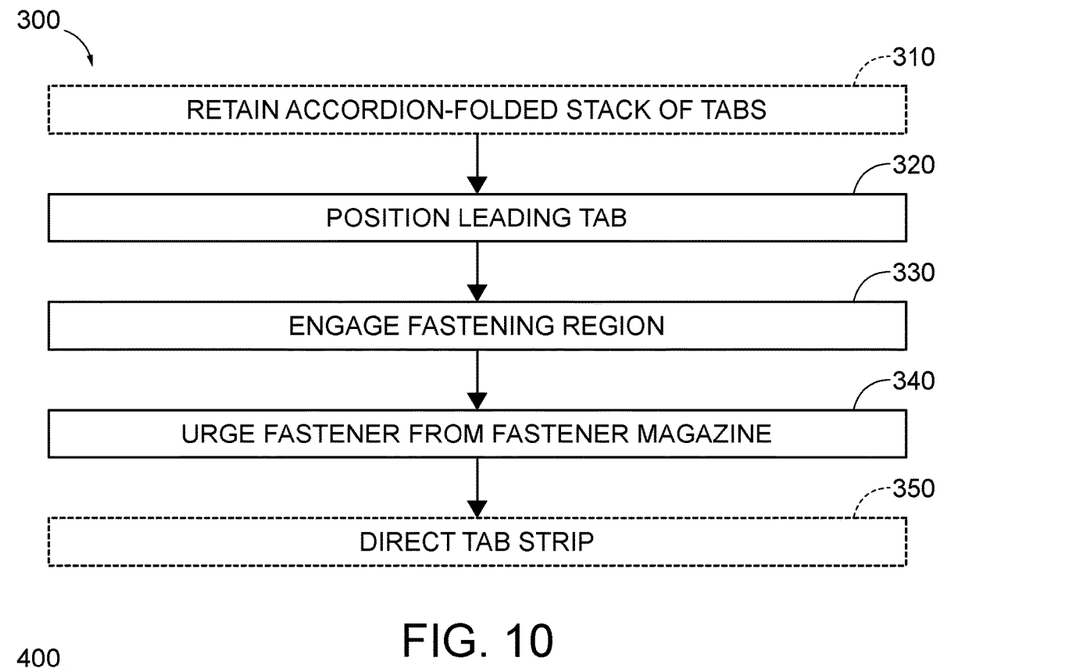
FIG. 10 is a flowchart depicting methods, according to the present disclosure, of utilizing a fastening device to operatively affix a leading tab of a plurality of interconnected tabs to a workpiece.

FIG. 10 is a flowchart depicting methods 300 according to the present disclosure, of utilizing a fastening device to operatively affix a leading tab of a plurality of interconnected tabs to a workpiece. Methods 300 may include methods of utilizing fastening device 10 of FIGS. 1-9.

Methods 300 may include retaining an accordion-folded stack of tabs at 310 and include positioning a leading tab at 320, engaging a fastening region at 330, and urging a fastener from a fastener magazine at 340. Methods 300 further may include directing a tab strip at 350.

Retaining the accordion-folded stack of tabs at 310 may include retaining the accordion-folded stack of tabs within a tab magazine. This may include retaining the accordion-folded stack of tabs, or retaining a first subset of the plurality of interconnected tabs in an accordion-folded manner, with a retention structure. Examples of the tab magazine and of the retention structure are disclosed herein.

Positioning the leading tab at 320 may include positioning the leading tab within a fastening region of the fastening device with a tab feed structure of the fastening device. The positioning at 320 may include extending a second subset of the plurality of interconnected tabs, which defines a tab strip, from the tab magazine, through a feed rail, and to the fastening region. During the positioning at 320, the first subset of the plurality of interconnected tabs, which defines the accordion-folded stack of tabs, may remain within the tab magazine. As discussed herein, the positioning at 320 may include unfolding a portion of the accordion-folded stack of tabs to extend the tab strip from the tab magazine, through the feed rail, and to the fastening region. As such, the positioning at 320 may include decreasing a number of interconnected tabs in the accordion-folded stack of tabs and/or increasing a number of interconnected tabs in the tab strip. Examples of the fastening region, the tab feed structure, the tab strip, and the feed rail are disclosed herein.

Engaging the fastening region at 330 may include engaging the fastening region with the workpiece. This may include positioning the fastening region proximal the workpiece, operatively contacting at least a portion of the fastening region with the workpiece, and/or orienting the fastening device, relative to the workpiece, such that the urging at 340 causes the fastener to be urged into the workpiece.

Urging the fastener from the fastener magazine at 340 may include urging the fastener from the fastener magazine with a fastening head of the fastening device. The urging at 340 further may include urging the fastener through the leading tab of the plurality of interconnected tabs and urging the fastener into the workpiece. As such, the urging at 340 operatively affixes the leading tab to the workpiece with the fastener.

Directing the tab strip at 350 may include directing the tab strip from a tab magazine opening of the tab magazine to a strip inlet of the feed rail. The directing at 350 may include directing with, via, and/or utilizing a transition structure. It is within the scope of the present disclosure that the tab magazine opening may face away from the fastening region. As such, the directing at 350 may include at least partially reversing a direction of the tab strip as the tab strip extends between the tab magazine and the fastening region. Examples of the tab magazine opening, the strip inlet, and the transition structure are disclosed herein.

Figure 11:
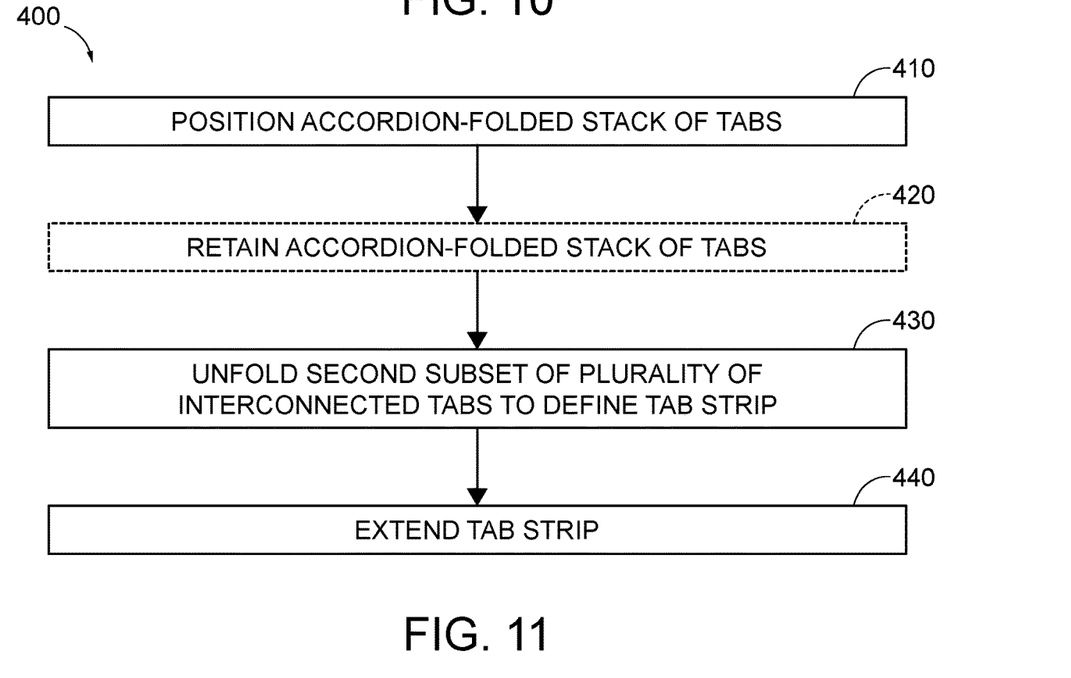
FIG. 11 is a flowchart depicting methods, according to the present disclosure, of loading a fastening device with a plurality of interconnected tabs arranged in an accordion-folded stack of tabs.

FIG. 11 is a flowchart depicting methods 400, according to the present disclosure, of loading a fastening device with a plurality of interconnected tabs arranged in an accordion-folded stack of tabs. Methods 300 may include methods of loading and/or utilizing fastening device 10 of FIGS. 1-9.

Methods 400 include positioning the accordion-folded stack of tabs at 410 and may include retaining the accordion-folded stack of tabs at 420. Methods 400 further include unfolding a second subset of the plurality of interconnected tabs to define a tab strip at 430 and extending the tab strip at 440.

Positioning the accordion-folded stack of tabs at 410 may include positioning the accordion-folded stack of tabs within a tab magazine of the fastening device. This may include positioning a plurality of interconnected tabs, which defines the accordion-folded stack of tabs, within the tab magazine and/or positioning at least a majority of the plurality of interconnected tabs, as the accordion-folded stack of tabs, within the tab magazine. Examples of the tab magazine and the plurality of interconnected tabs are disclosed herein.

Retaining the accordion-folded stack of tabs at 420 may include retaining the accordion-folded stack of tabs, within the tab magazine, in any suitable manner. The retaining at 420 may be at least substantially similar to the retaining at 310, which is discussed herein with reference to methods 300 of FIG. 10.

Unfolding the second subset of the plurality of interconnected tabs to define the tab strip at 430 may include unfolding the second subset of the plurality of interconnected tabs from the accordion-folded stack of tabs. Subsequent to the unfolding at 430, the accordion-folded stack of tabs may be defined by a first subset of the plurality of interconnected tabs that is different from the second subset of the plurality of interconnected tabs that defines the tab strip.

Extending the tab strip at 440 may include extending the tab strip through a tab magazine opening of the fastening device, through a feed rail of the fastening device, and to a fastening region of the fastening device. The extending at 440 may include reversing, or at least substantially reversing, a direction of the tab strip as the tab strip extends from the tab magazine opening to the feed rail. Examples of the tab magazine opening, the feed rail, and the fastening region are disclosed herein.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of fastening devices and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A fastening device, comprising:
a handle configured to be gripped by a user;
a trigger mechanism configured to be actuated by the user;
a fastener magazine configured to contain a plurality of fasteners;
a fastening head defining a fastening region; and
a tab feed structure, including:
(i) a tab magazine configured to contain an accordion-folded stack of tabs, which is formed from a first subset of a plurality of interconnected tabs;
(ii) a feed rail configured to receive a tab strip, which is formed from a second subset of the plurality of interconnected tabs, from the tab magazine and to direct the tab strip from the tab magazine toward the fastening region; and
(iii) a tab advance mechanism configured to selectively advance the tab strip toward the fastening region;
wherein, upon actuation of the trigger mechanism, the fastening device is configured to:
(i) urge, with the fastening head and within the fastening region, a fastener of the plurality of fasteners through a leading tab of the plurality of interconnected tabs and into a workpiece to operatively affix the leading tab to the workpiece with the fastener; and
(ii) advance, with the tab advance mechanism, the tab strip toward the fastening region.

A2. The fastening device of paragraph A1, wherein the tab feed structure is configured to operatively retain the accordion-folded stack of tabs within the tab magazine and to selectively urge the tab strip from the tab magazine responsive to actuation of the tab advance mechanism.

A3. The fastening device of any of paragraphs A1-A2, wherein, responsive to advancement of the tab strip toward the fastening region, a number of interconnected tabs in the first subset of the plurality of interconnected tabs decreases.

A4. The fastening device of any of paragraphs A1-A3, wherein, upon actuation of the trigger mechanism, the fastening device further is configured to separate the leading tab from the tab strip.

A5. The fastening device of any of paragraphs A1-A4, wherein the tab magazine is spaced-apart, or distinct, from the fastener magazine.

A6. The fastening device of any of paragraphs A1-A5, wherein the tab magazine defines a tab magazine longitudinal axis, wherein the fastener magazine defines a fastener magazine longitudinal axis, and further wherein the tab magazine longitudinal axis is parallel, or at least substantially parallel, to the fastener magazine longitudinal axis.

A7. The fastening device of any of paragraphs A1-A6, wherein the tab magazine defines a tab magazine opening and a tab-receiving volume.

A8. The fastening device of paragraph A7, wherein the tab magazine opening:
(i) is shaped to permit insertion of the accordion-folded stack of tabs into the tab-receiving volume; and
(ii) is shaped to permit the tab strip to exit the tab-receiving volume.

A9. The fastening device of any of paragraphs A7-A8, wherein the tab-receiving volume is shaped to receive the accordion-folded stack of tabs.

A10. The fastening device of any of paragraphs A7-A9, wherein the tab magazine opening faces in an opening direction, and further wherein the feed rail is configured to direct the tab strip in a feed rail direction that at least one of:
(i) is different from the opening direction;
(ii) is opposed to the opening direction;
(iii) defines a skew angle with the opening direction, and
(iv) defines an obtuse angle with the opening direction.

A11. The fastening device of any of paragraphs A1-A10, wherein the tab feed structure further includes a retention structure configured to retain the accordion-folded stack of tabs within the tab magazine.

A12. The fastening device of paragraph A11, wherein the retention structure is configured to at least one of:
(i) form a frictional interface with the accordion-folded stack of tabs;
(ii) form an interference fit with the accordion-folded stack of tabs; and
(iii) mechanically engage the accordion-folded stack of tabs.

A13. The fastening device of any of paragraphs A11-A12, wherein the retention structure is configured to apply a retention force to the accordion-folded stack of tabs, wherein the tab advance mechanism is configured to apply a tab advance force to the tab strip, and further wherein the tab advance force is greater than the retention force.

A14. The fastening device of any of paragraphs A11-A13, wherein the retention structure includes at least one of:
(i) a fabric configured to mechanically engage the accordion-folded stack of tabs;
(ii) a projection configured to mechanically engage the accordion-folded stack of tabs;
(iii) a rib configured to mechanically engage the accordion-folded stack of tabs; and
(iv) a plurality of fibers configured to mechanically engage the accordion-folded stack of tabs.

A15. The fastening device of any of paragraphs A11-A14, wherein the tab magazine defines an internal surface, and further wherein the retention structure at least one of:
(i) projects from the internal surface; and
(ii) is defined by the internal surface.

A16. The fastening device of any of paragraphs A1-A15, wherein the feed rail is at least one of:
(i) a unitary feed rail;
(ii) an extruded feed rail; and
(iii) a machined feed rail.

A17. The fastening device of any of paragraphs A1-A16, wherein the feed rail defines a feed channel sized to receive and retain the tab strip.

A18. The fastening device of paragraph A17, wherein the feed channel defines a strip inlet, which is configured to receive the tab strip, and a strip outlet, which is proximal the fastening region relative to the strip inlet.

A19. The fastening device of paragraph A18, wherein the strip inlet at least one of:
(i) faces away from a/the tab magazine opening of the tab magazine;
(ii) faces in a same direction as the magazine opening; and
(iii) faces toward the magazine opening.

A20. The fastening device of any of paragraphs A1-A19, wherein the feed rail extends at least partially between a/the tab magazine opening of the tab magazine and the fastening region.

A21. The fastening device of any of paragraphs A1-A20, wherein the fastening device further includes at least one transition structure configured to direct the tab strip from a/the tab magazine opening of the tab magazine to a/the strip inlet of the feed rail.

A22. The fastening device of paragraph A21, wherein the transition structure includes at least one of:
(i) a rounded edge;
(ii) a roller; and
(iii) a dovetail region.

A23. The fastening device of any of paragraphs A21-A22, wherein the transition structure at least one of:
(i) is defined by the feed rail; and
(ii) is distinct from the feed rail.

A24. The fastening device of any of paragraphs A1-A23, wherein the tab advance mechanism is configured to selectively advance a selected number of tabs, within the tab strip, toward the fastening region for each actuation of the trigger mechanism, optionally wherein the selected number of tabs includes 1, 2, 3, 4, 5, at least 1, at least 2, at least 3, at least 4, or at least 5 tabs.

A25. The fastening device of any of paragraphs A1-A24, wherein, for a given actuation of the trigger mechanism, the tab advance mechanism is configured to at least one of:
(i) selectively advance the tab strip prior to the fastener being urged through the leading tab by the fastening head; and
(ii) selectively advance the tab strip subsequent to the fastener being urged through the leading tab by the fastening head.

A26. The fastening device of any of paragraphs A1-A25, wherein the tab advance mechanism includes at least one of:
(i) a linear actuator; and
(ii) a pneumatic cylinder.

A27. The fastening device of any of paragraphs A1-A26, wherein the tab advance mechanism is configured to operatively engage with an indexing structure, which is defined by the tab strip, to selectively advance the tab strip toward the fastening region.

A28. The fastening device of any of paragraphs A1-A27, wherein the fastening head is at least one of:
(i) an electrically actuated fastening head; and
(ii) a pneumatically actuated fastening head.

A29. The fastening device of any of paragraphs A1-A28, wherein, upon actuation of the trigger mechanism, the fastening head is configured to urge the fastener from the fastener magazine.

A30. The fastening device of any of paragraphs A1-A29, wherein the fastening head includes a driving anvil configured to urge the selected fastener into the workpiece.

A31. The fastening device of any of paragraphs A1-A30, wherein the trigger mechanism includes a fastening operational linkage, which is configured to control the operation of the fastening head, optionally wherein the fastening operational linkage includes at least one of a mechanical fastening operational linkage, a pneumatic fastening operational linkage, and an electric fastening operational linkage.

A32. The fastening device of any of paragraphs A1-A31, wherein the trigger mechanism includes a tab feed operational linkage, which is configured to control the operation of the tab feed structure, optionally wherein the tab feed operational linkage includes at least one of a mechanical tab feed operational linkage, a pneumatic tab feed operational linkage, and an electric tab feed operational linkage.

A33. The fastening device of any of paragraphs A1-A32, wherein the fastening device includes the plurality of interconnected tabs.

A34. The fastening device of any of paragraphs A1-A33, wherein the first subset of the plurality of interconnected tabs is arranged in the accordion-folded stack of tabs and is positioned within the tab magazine.

A35. The fastening device of any of paragraphs A1-A34, wherein the second subset of the plurality of interconnected tabs extends from the tab magazine as the tab strip, extends through the feed rail, and extends to the fastening region.

A36. The fastening device of any of paragraphs A1-A35, wherein the accordion-folded stack of tabs includes a plurality of tab layers, optionally wherein at least one of:
(i) each tab layer in the plurality of tab layers includes 1, 2, 3, 4, 5, at least 1, at least 2, at least 3, at least 4, at most 10, at most 8, at most 6, at most 4, and/or at most 2 tabs; and
(ii) the plurality of tab layers includes at least 5, at least 10, at least 15, at least 20, at least 25, at least 30, at least 40, at least 50, at least 60, at least 70, at least 80, at least 90, or at least 100 tab layers.

A37. The fastening device of any of paragraphs A1-A36, wherein each tab in the plurality of interconnected tabs is separated from an adjacent tab in the plurality of interconnected tabs by a perforation.

A38. The fastening device of any of paragraphs A1-A37, wherein the accordion-folded stack of tabs is folded at a plurality of perforations in the plurality of interconnected tabs.

A39. The fastening device of any of paragraphs A1-A38, wherein the plurality of interconnected tabs defines a plurality of indexing structures configured to operatively engage with the tab advance mechanism.

A40. The fastening device of paragraph A39, wherein each indexing structure is at least one of:
(i) associated with a given tab in the plurality of interconnected tabs;
(ii) defined by the given tab in the plurality of interconnected tabs; and
(iii) defined by two adjacent tabs in the plurality of interconnected tabs.

A41. The fastening device of any of paragraphs A1-A40, wherein each tab in the plurality of interconnected tabs is planar, or at least substantially planar.

A42. The fastening device of any of paragraphs A1-A41, wherein the tab strip reverses, or at least substantially reverses, direction between exiting the tab magazine and entering the feed rail.

A43. The fastening device of any of paragraphs A1-A42, wherein the fastening device includes the plurality of fasteners.

A44. The fastening device of any of paragraphs A1-A43, wherein the plurality of fasteners includes at least one of:
(i) a plurality of staples; and
(ii) a plurality of nails.

A45. The fastening device of any of paragraphs A1-A44, wherein the plurality of fasteners is arranged, within the fastener magazine, in a fastener stack, optionally wherein each fastener within the fastener stack is operatively affixed to at least one adjacent fastener.

A46. The fastening device of any of paragraphs A1-A45, wherein the fastening device includes at least one of:
(i) a pneumatic fastening device;
(ii) an electric fastening device;
(iii) a cordless fastening device;
(iv) a stapler; and
(v) a nailer.

B1. A method of utilizing a fastening device to operatively affix a leading tab, of a plurality of interconnected tabs, to a workpiece with a fastener, the method comprising:
positioning, with a tab feed structure of the fastening device, the leading tab within a fastening region of the fastening device, wherein the positioning includes extending a second subset of the plurality of interconnected tabs, which defines a tab strip, from a tab magazine, through a feed rail, and to the fastening region, and further wherein, a first subset of the plurality of interconnected tabs defines an accordion-folded stack of tabs within the tab magazine;
engaging the fastening region with the workpiece; and
urging, with a fastening head of the fastening device, the fastener from a fastener magazine, through the leading tab, and into the workpiece.

B2. The method of paragraph B1, wherein the positioning includes unfolding a portion of the accordion-folded stack of tabs to extend the tab strip from the tab magazine, through the feed rail, and to the fastening region.

B3. The method of any of paragraphs B1-B2, wherein the method further includes retaining the accordion-folded stack of tabs within the tab magazine with a retention structure.

B4. The method of any of paragraphs B1-B3, wherein the method further includes directing the tab strip from a tab magazine opening of the tab magazine to a strip inlet of the feed rail with a transition structure.

B5. The method of paragraph B4, wherein the tab magazine opening faces away from the fastening region, and further wherein the directing includes at least partially reversing a direction of the tab strip as the tab strip extends between the tab magazine and the fastening region.

C1. A method of loading a fastening device with a plurality of interconnected tabs arranged in an accordion-folded stack of tabs, the method comprising:
positioning the accordion-folded stack of tabs within a tab magazine of the fastening device;
unfolding a second subset of the plurality of interconnected tabs from the accordion-folded stack of tabs to define a tab strip, wherein, subsequent to the unfolding, the accordion-folded stack of tabs is defined by a first subset of the plurality of interconnected tabs; and extending the tab strip through a tab magazine opening of the tab magazine, through a feed rail of the fastening device, and to a fastening region of the fastening device.

C2. The method of paragraph C1, wherein the method further includes retaining a folded portion of the accordion-folded stack of tabs within the tab magazine with a retention structure.

C3. The method of any of paragraphs C1-C2, wherein the extending includes reversing, or at least substantially reversing, a direction of the tab strip as the tab strip extends from the tab magazine opening to the feed rail.

D1. The method of any of paragraphs B1-C3, wherein the fastening device includes any suitable structure, component, and/or feature of any of the fastening devices of any of paragraphs A1-A46.

INDUSTRIAL APPLICABILITY

The devices and methods disclosed herein are applicable to the fastening device, lumber wrap, and tab fastening industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A fastening device, comprising:
a handle configured to be gripped by a user;
a trigger mechanism configured to be actuated by the user's finger;
a fastener magazine configured to contain a plurality of fasteners;
a fastening head defining a fastening region; and
a tab feed structure, including:
(i) a tab magazine configured to contain an accordion-folded stack of tabs, which is formed from a first subset of a plurality of interconnected tabs;
(ii) a feed rail configured to receive a tab strip, which is formed from a second subset of the plurality of interconnected tabs, from the tab magazine and to direct the tab strip from the tab magazine toward the fastening region; and
(iii) a tab advance mechanism configured to selectively advance the tab strip toward the fastening region;
wherein, upon actuation of the trigger mechanism, the fastening device is configured to:
(i) urge, with the fastening head and within the fastening region, a fastener of the plurality of fasteners through a leading tab of the plurality of interconnected tabs and into a workpiece to operatively affix the leading tab to the workpiece with the fastener; and
(ii) advance, with the tab advance mechanism, the tab strip toward the fastening region.

2. The fastening device of claim 1, wherein the tab feed structure is configured to operatively retain the accordion-folded stack of tabs within the tab magazine and to selectively urge the tab strip from the tab magazine responsive to actuation of the tab advance mechanism.

3. The fastening device of claim 1, wherein, responsive to advancement of the tab strip toward the fastening region, a number of interconnected tabs in the first subset of the plurality of interconnected tabs decreases.

4. The fastening device of claim 1, wherein, upon actuation of the trigger mechanism, the fastening device further is configured to separate the leading tab from the tab strip.

5. The fastening device of claim 1, wherein the tab magazine further includes a retention structure configured to retain the accordion-folded stack of tabs within the tab magazine, wherein the retention structure is configured to at least one of:
   (i) form a frictional interface with the accordion-folded stack of tabs;
   (ii) form an interference fit with the accordion-folded stack of tabs; and
   (iii) mechanically engage the accordion-folded stack of tabs.

6. The fastening device of claim 1, wherein the feed rail defines a feed channel sized to receive and retain the tab strip, and wherein an orientation of the feed rail relative to the fastening head remains fixed during actuation of the trigger mechanism.

7. The fastening device of claim 6, wherein the feed channel defines a strip inlet, which is configured to receive the tab strip, and a strip outlet, which is proximal the fastening region relative to the strip inlet.

8. The fastening device of claim 1, wherein the feed rail extends at least partially between a tab magazine opening of the tab magazine and the fastening region.

9. The fastening device of claim 1, wherein the fastening device further includes at least one transition structure configured to direct the tab strip from a tab magazine opening of the tab magazine to a strip inlet of the feed rail.

10. The fastening device of claim 1, wherein the tab advance mechanism includes a pneumatic cylinder.

11. The fastening device of claim 1, wherein the tab advance mechanism is configured to operatively engage with an indexing structure, which is defined by the tab strip, to selectively advance the tab strip toward the fastening region.

12. The fastening device of claim 1, wherein the trigger mechanism includes a fastening operational linkage, which is configured to control the operation of the fastening head.

13. The fastening device of claim 1, wherein the trigger mechanism includes a tab feed operational linkage, which is configured to control the operation of the tab feed structure.

14. The fastening device of claim 1, wherein the fastening device includes the plurality of interconnected tabs, wherein the first subset of the plurality of interconnected tabs is arranged in the accordion-folded stack of tabs and is positioned within the tab magazine, and further wherein the second subset of the plurality of interconnected tabs extends from the tab magazine as the tab strip, extends through the feed rail, and extends to the fastening region.

15. The fastening device of claim 14, wherein the first subset of the plurality of interconnected tabs is configured to advance linearly in a first direction within the tab magazine, and wherein the second subset of the plurality of interconnected tabs is configured to advance linearly in a second direction, opposite the first direction, within the feed rail, such that the tab strip at least substantially reverses direction between exiting the tab magazine and entering the feed rail.

16. A method of utilizing the fastening device of claim 1 to operatively affix the leading tab, of the plurality of interconnected tabs, to a workpiece with a fastener, the method comprising:
   positioning, with the tab feed structure of the fastening device, the leading tab within the fastening region of the fastening device, wherein the positioning includes extending the second subset of the plurality of interconnected tabs, from the tab magazine, through the feed rail, and to the fastening region;
   engaging the fastening region with the workpiece; and
   urging, with the fastening head of the fastening device, the fastener from the fastener magazine, through the leading tab, and into the workpiece.

17. The method of claim 16, wherein the positioning includes unfolding a portion of the accordion-folded stack of tabs to extend the tab strip from the tab magazine, through the feed rail, and to the fastening region.

18. The method of claim 16, wherein the method further includes directing the tab strip from a tab magazine opening of the tab magazine to a strip inlet of the feed rail with a transition structure, wherein the tab magazine opening faces away from the fastening region, and further wherein the directing includes at least partially reversing a direction of the tab strip as the tab strip extends between the tab magazine and the fastening region.

19. A method of loading the fastening device of claim 1 with the plurality of interconnected tabs arranged in the accordion-folded stack of tabs, the method comprising:
   positioning the accordion-folded stack of tabs within the tab magazine of the fastening device;
   unfolding the second subset of the plurality of interconnected tabs from the accordion-folded stack of tabs to define the tab strip, wherein, subsequent to the unfolding, the accordion-folded stack of tabs is defined by the first subset of the plurality of interconnected tabs; and
   extending the tab strip through a tab magazine opening of the tab magazine, through the feed rail of the fastening device, and to the fastening region of the fastening device.

20. The method of claim 19, wherein the extending includes at least substantially reversing a direction of the tab strip as the tab strip extends from the tab magazine opening to the feed rail.

21. A fastening device, comprising:
   a handle configured to be gripped by a user;
   a trigger mechanism configured to be actuated by the user;
   a fastener magazine configured to contain a plurality of fasteners;
   a fastening head defining a fastening region; and
   a tab feed structure, including:
   (i) a tab magazine configured to contain an accordion-folded stack of tabs, which is formed from a first subset of a plurality of interconnected tabs, wherein the tab magazine further includes a retention structure configured to retain the accordion-folded stack of tabs within the tab magazine, wherein the retention structure is configured to at least one of:
      (1) form a frictional interface with the accordion-folded stack of tabs;
      (2) form an interference fit with the accordion-folded stack of tabs; and
      (3) mechanically engage the accordion-folded stack of tabs;
   (ii) a feed rail configured to receive a tab strip, which is formed from a second subset of the plurality of interconnected tabs, from the tab magazine and to direct the tab strip from the tab magazine toward the fastening region; and
   (iii) a tab advance mechanism configured to selectively advance the tab strip toward the fastening region;
   wherein, upon actuation of the trigger mechanism, the fastening device is configured to:

(i) urge, with the fastening head and within the fastening region, a fastener of the plurality of fasteners through a leading tab of the plurality of interconnected tabs and into a workpiece to operatively affix the leading tab to the workpiece with the fastener; and
(ii) advance, with the tab advance mechanism, the tab strip toward the fastening region.

22. A fastening device, comprising:
a handle configured to be gripped by a user;
a trigger mechanism configured to be actuated by the user;
a fastener magazine configured to contain a plurality of fasteners;
a fastening head defining a fastening region; and
a tab feed structure, including:
(i) a tab magazine configured to contain an accordion-folded stack of tabs, which is formed from a first subset of a plurality of interconnected tabs;
(ii) a feed rail configured to receive a tab strip, which is formed from a second subset of the plurality of interconnected tabs, from the tab magazine and to direct the tab strip from the tab magazine toward the fastening region, wherein the feed rail defines a feed channel sized to receive and retain the tab strip; and
(iii) a tab advance mechanism configured to selectively advance the tab strip toward the fastening region;
wherein, upon actuation of the trigger mechanism, the fastening device is configured to:
(i) urge, with the fastening head and within the fastening region, a fastener of the plurality of fasteners through a leading tab of the plurality of interconnected tabs and into a workpiece to operatively affix the leading tab to the workpiece with the fastener; and
(ii) advance, with the tab advance mechanism, the tab strip toward the fastening region; and
wherein an orientation of the feed rail relative to the fastening head remains fixed during actuation of the trigger mechanism.

\* \* \* \* \*